Dec. 6, 1932.　　　C. C. CARSTENS　　　1,889,744
AUTOMOBILE SIGNALING DEVICE
Filed Feb. 23, 1928
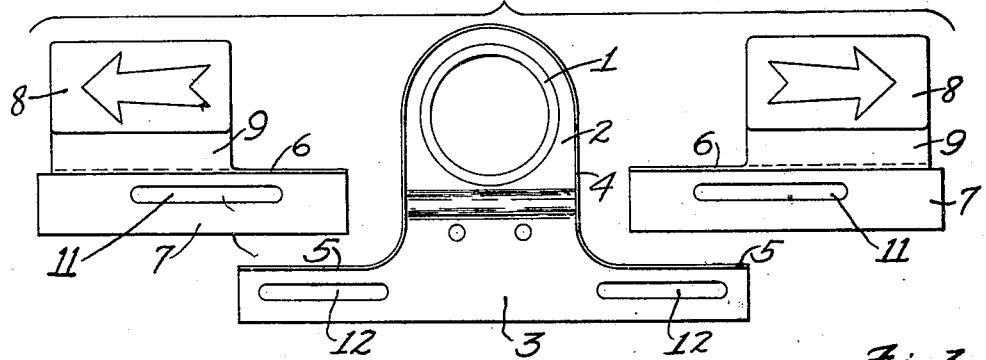
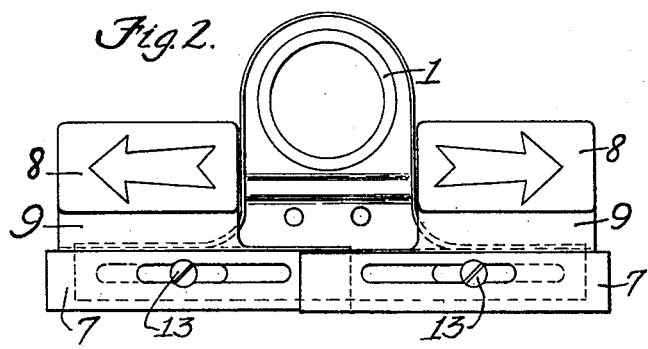 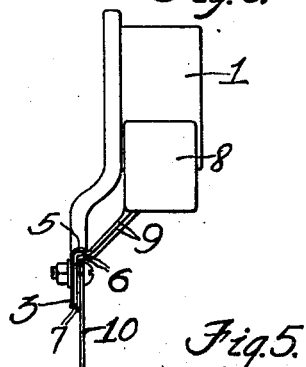
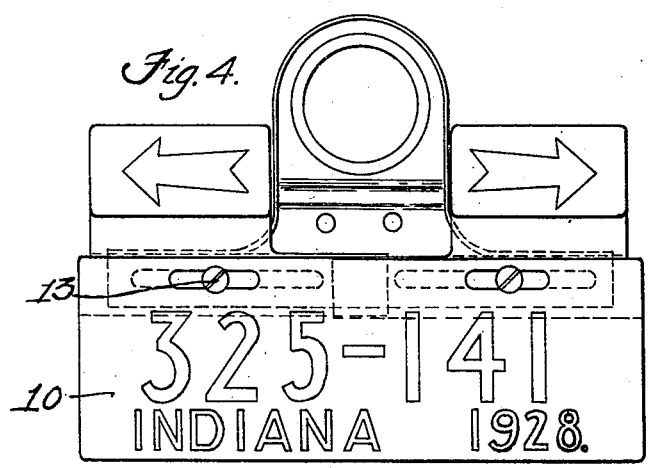 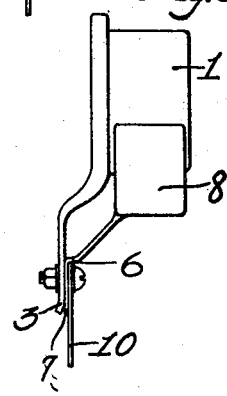
INVENTOR.
Carl C. Carstens
BY
ATTORNEY.

Patented Dec. 6, 1932

1,889,744

UNITED STATES PATENT OFFICE

CARL C. CARSTENS, OF MICHIGAN CITY, INDIANA

AUTOMOBILE SIGNALING DEVICE

Application filed February 23, 1928. Serial No. 256,381.

The invention relates to automobile vehicle direction signals, and has for its object to provide light boxes with flanges adapted to be secured to the license plate bracket, preferably a bracket of the type wherein the tail light is formed as a part thereof, thereby allowing light boxes to be easily and quickly attached to standard tail light and license plate supporting equipment without varying the construction thereof.

A further object is to interpose the flanges of the light boxes between the license plate bracket and the license plate and to provide a single securing means extending through the plate, the light box flanges and the license plate bracket for rigidly securing the same together.

A further object is to provide the light box flanges with shoulders overlying the edge of the license plate for preventing pivotal displacement of the light boxes, incident to shocks and jars as the vehicle moves over rough ground.

A further object is to provide light boxes which may be easily and quickly attached to the license plate of an automobile.

A further object is to provide the license plate bracket with a flange overlying the shoulder of the light box flange, and to position the light box flange whereby it will engage the edge of the license plate and support the light box rearwardly in relation to the vehicle and license plate.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a collective view in elevation of the tail light, license plate bracket carried thereby, and vehicle direction light boxes in position to be assembled.

Figure 2 is a view in elevation of the light boxes assembled on the license plate bracket and the tail light.

Figure 3 is a side elevation of the assembled light boxes.

Figure 4 is a view similar to Figure 2, showing the license plate in position.

Figure 5 is a side elevation of a modified form wherein the light boxes are attached to the license plate.

Referring to the drawing, the numeral 1 designates a tail light box, which is carried by the plate 2, and which plate is provided with a rearwardly offset license plate bracket 3 formed integral therewith. Plate 2 is provided with a marginal flange 4, which flange merges into forwardly extending flanges 5 carried by the upper side of the bracket 3, and which flanges 5 are adapted to overlie the shoulders 6 carried by the upper edge of the rearwardly offset flanges 7 of the vehicle direction light boxes 8, which light boxes are adapted to be illuminated in any suitable manner for indicating the direction of a contemplated turn. The light boxes 8 are connected to the shoulders 6 by means of downwardly and rearwardly inclined integral plates 9, and are preferably disposed in the plane of a tail light box 1 as shown in Figure 3.

In assembling the device or applying the light boxes 8, the license plate 10 is removed from the bracket 3, then the flanges 7 are placed on the bracket 3 with their elongated apertures 11 registering with the elongated apertures 12 in the bracket 3. After the above operation the license plate 10 is placed in position, and the securing bolts 13 are passed through the license plate apertures, the registering apertures 11 and 12, and tightened. It will be noted by referring to Figure 3 that the shoulders 6 of the plate 7 engage the upper edge of the license plate 10 and the under side of the flanges 5 of the license plate bracket 3, therefore the light boxes are rigidly held and prevented from pivotal movement even though they are secured with single bolts. It will be noted by overlapping the inner adjacent ends of the flanges 7, the vehicle direction signaling boxes 8 may be adjusted relatively close to the tail light, and it will also be noted by providing the elongated apertures 11, the boxes 8 may be adjusted inwardly and outwardly in relation to the tail light box, which allows a wide range of adjustability to accommodate the device to tail lights of various sizes and construction.

Referring to Figure 5 wherein a modified form is shown, the flanges 5 of the license plate bracket 3 are eliminated and the shoulder 6 of the flange 7 of the vehicle direction signaling boxes is relied upon for cooperating with license plate 10 for preventing pivotal movement of the boxes, otherwise the construction and operation is the same as in other figures.

From the above it will be seen that vehicle signaling light boxes are provided which may be easily and quickly attached to a license plate bracket between the bracket and license plate and provided with means whereby they will cooperate with the bracket and license plate for preventing displacement of the light boxes. It will also be seen that means are provided whereby the vehicle direction light boxes may be easily and quickly adjusted inwardly and outwardly in relation to the tail light without disassembling the entire device, by simply loosening the bolts 13, moving the boxes 8 to the desired position and then tightening the bolts.

The invention having been set forth what is claimed as new and useful is:—

1. The combination with a tail light having a license plate bracket, a license plate and means securing said license plate to said bracket at opposite ends thereof, of vehicle direction signal light boxes at opposite sides of the tail light, a depending supporting plate carried by each light box and provided with an aperture to receive one of said license plate securing means and also having an off-set means adapted to engage an edge of the license plate to cooperate with the holding means to prevent relative rotary movement of the light box with respect to the plate when the latter are secured together.

2. The combination as set forth in claim 1, with the aperture in said supporting plate elongated in the horizontal plane whereby said light boxes may be adjusted towards or away from the tail light and each other.

3. A direction signaling means adapted to be secured to a tail light provided with a license plate securing bracket comprising a light box provided with a depending supporting plate having an aperture to receive the license plate securing means and also including off-set means adapted to engage an edge of the license plate to cooperate with the holding means to prevent relative rotary movement of the light box with respect to the plate when the latter are secured together.

In testimony whereof I affix my signature

CARL C. CARSTENS.